US011409576B2

(12) United States Patent
Ghafourifar (10) Patent No.: US 11,409,576 B2
(45) Date of Patent: Aug. 9, 2022

(54) DYNAMIC DISTRIBUTION OF A WORKLOAD PROCESSING PIPELINE ON A COMPUTING INFRASTRUCTURE

(71) Applicant: Entefy Inc., Palo Alto, CA (US)

(72) Inventor: Alston Ghafourifar, Los Altos Hills, CA (US)

(73) Assignee: Entefy Inc., Palo Alto, CA (US)

( * ) Notice: Subject to any disclaimer, the term of this patent is extended or adjusted under 35 U.S.C. 154(b) by 0 days.

(21) Appl. No.: 16/889,509

(22) Filed: Jun. 1, 2020

(65) Prior Publication Data

US 2021/0117243 A1 Apr. 22, 2021

Related U.S. Application Data

(63) Continuation of application No. 15/858,822, filed on Dec. 29, 2017, now abandoned, and a continuation of application No. 15/858,852, filed on Dec. 29, 2017, now abandoned.

(51) Int. Cl.
| | |
|---|---|
| *G06F 9/46* | (2006.01) |
| *G06F 9/50* | (2006.01) |
| *G06F 9/48* | (2006.01) |
| *H04L 47/70* | (2022.01) |
| *G06T 1/20* | (2006.01) |
| *G06N 3/02* | (2006.01) |

(52) U.S. Cl.
CPC .............. *G06F 9/5077* (2013.01); *G06F 9/48* (2013.01); *G06F 9/5005* (2013.01); *H04L 47/82* (2013.01); *G06F 2209/501* (2013.01); *G06N 3/02* (2013.01); *G06T 1/20* (2013.01)

(58) Field of Classification Search
CPC .................................................... G06F 9/5077
USPC ......................................................... 718/104
See application file for complete search history.

(56) References Cited

U.S. PATENT DOCUMENTS

| | | | |
|---|---|---|---|
| 6,944,606 B2 | 9/2005 | Schmit et al. | |
| 7,290,056 B1 * | 10/2007 | McLaughlin, Jr. | .......................... H04L 43/0852 709/201 |
| 7,636,450 B1 * | 12/2009 | Bourdev | ............. G06F 16/5838 382/100 |

(Continued)

FOREIGN PATENT DOCUMENTS

| | | | |
|---|---|---|---|
| CN | 101295379 A | * | 10/2008 |
| CN | 105184403 B | * | 9/2018 |

*Primary Examiner* — Evral E Bodden
(74) *Attorney, Agent, or Firm* — Haynes and Boone, LLP (57) ABSTRACT

Disclosed are systems, methods, and computer readable media for automatically assessing and allocating virtualized resources (such as central processing unit (CPU) and graphics processing unit (GPU) resources). In some embodiments, this method involves a computing infrastructure receiving a request to perform a workload, determining one or more workflows for performing the workload, selecting a virtualized resource, from a plurality of virtualized resources, wherein the virtualized resource is associated with a hardware configuration, and wherein selecting the virtualized resources is based on a suitability score determined based on benchmark scores of the one or more workflows on the hardware configuration, scheduling performance of at least part of the workload on the selected virtualized resource, and outputting results of the at least part of the workload.

20 Claims, 10 Drawing Sheets

(56) References Cited

U.S. PATENT DOCUMENTS

| | | | | |
|---|---|---|---|---|
| 7,676,472 | B2* | 3/2010 | Kurhekar | H04L 67/36 |
| | | | | 707/999.01 |
| 8,436,911 | B2* | 5/2013 | Leebow | G06F 16/784 |
| | | | | 348/222.1 |
| 9,280,386 | B1* | 3/2016 | Hagmann | G06F 9/4881 |
| 10,097,620 | B2* | 10/2018 | Reddy | H04L 43/065 |
| 10,250,451 | B1* | 4/2019 | Moghe | H04L 41/14 |
| 2010/0114618 | A1* | 5/2010 | Wilcock | G06Q 10/06375 |
| | | | | 705/7.37 |
| 2013/0111468 | A1* | 5/2013 | Davis | G06F 9/5077 |
| | | | | 718/1 |
| 2013/0204866 | A1* | 8/2013 | Fork | G06F 16/532 |
| | | | | 707/723 |
| 2015/0100530 | A1* | 4/2015 | Mnih | G06N 20/00 |
| | | | | 706/25 |
| 2015/0339572 | A1 | 11/2015 | Achin et al. | |
| 2016/0162837 | A1 | 6/2016 | Muntes Mulero et al. | |
| 2017/0017522 | A1 | 1/2017 | Daga et al. | |
| 2017/0230733 | A1 | 8/2017 | Rana et al. | |
| 2018/0234490 | A1 | 8/2018 | Moss et al. | |
| 2021/0174155 | A1* | 6/2021 | Smith | G06K 9/6228 |

* cited by examiner

| Workflow | Required Hardware | Workflow Size |
|---|---|---|
| Model A | CPU | Class A |
| Model B | CPU/GPU | Class B |
| Model C | GPU | Class C |
| ... | ... | ... |

*FIG. 7A*

| VR ID | GPU Type | GPU Cores | Memory | Power Consumption | ... |
|---|---|---|---|---|---|
| VR 1 | V100 | 5120 | 16 GB | 300W | ... |
| VR 2 | TitanX | 3584 | 12 GB | 250W | ... |
| VR 3 | 950GTX | 768 | 2 GB | 90W | ... |
| ... | ... | ... | ... | ... | ... |

*FIG. 7B*

| Workflow | Memory Class | VR 1 - Benchmark A (ms) | VR 2 - Benchark A (ms) | VR 3 - Benchark A (ms) | ... |
|---|---|---|---|---|---|
| Model A | Class A | N/A | N/A | 4675 | ... |
| Model B | Class B | N/A | 250 | 200 | ... |
| Model C | Class C | 587 | 350 | 200 | ... |
| ... | ... | ... | ... | ... | |

DYNAMIC DISTRIBUTION OF A WORKLOAD PROCESSING PIPELINE ON A COMPUTING INFRASTRUCTURE

CROSS REFERENCE TO RELATED APPLICATIONS

This application is a continuation of U.S. application Ser. No. 15/858,822, filed Dec. 29, 2017 and U.S. application Ser. No. 15/858,852, filed Dec. 29, 2017, all of which are incorporated herein in their entirety by reference.

TECHNICAL FIELD

This disclosure relates generally to apparatuses, methods, and computer readable media for predicting and allocating computing resources for workloads.

BACKGROUND

Modern computing infrastructures allow computational resources to be shared through one or more networks, such as the internet. For example, a cloud computing infrastructure may enable users, such as individuals and/or organizations, to access shared pools of computing resources, such as servers, both virtual and real, storage devices, networks, applications, and/or other computing based services. Remote services allow users to access computing resources on demand remotely in order to perform a variety computing functions. These functions may include computing data. For example, cloud computing may provide flexible access to computing resources without accruing up-front costs, such as purchasing computing devices, networking equipment, etc. and investing time in establishing a private network infrastructure. Utilizing remote computing resources, users are able to focus on their core functionality rather than optimizing data center operations.

With today's communications networks, examples of cloud computing services a user may access includes software as a service (SaaS), platform as a service (PaaS), and infrastructure as a service (IaaS) technologies. SaaS is a delivery model that provides software as a service rather than an end product, while PaaS acts an extension of SaaS that goes beyond providing software services by offering customizability and expandability features to meet a user's needs. Another example of cloud computing service includes infrastructure as a service (IaaS), where APIs are provided to access various computing resources, such as raw block storage, file or object level storage, virtual local area networks, firewalls, load balancers, etc. Service systems may handle requests for various resources using virtualized resources (VRs). VRs allows for hardware resources, such as servers, to be pooled for use by the service systems. These VRs may be configured using pools of hypervisors for virtual machines (VMs) or through containerization.

Containerization, or containers, are generally a logical packaging mechanism of resources for running an application which are abstracted out from the environment in which they are actually run. Multiple containers generally may be run directly on top of a host OS kernel and each container generally contains the resources, such as storage, memory, and APIs needed to run a particular application the container is set up to run. In certain cases, containers may be resized by adding or removing resources dynamically to account for workloads or a generic set of resources may be provided to handle different applications. As containers are created on and managed by a host system at a low level, they can be spawned very quickly. Containers may be configured to allow access to host hardware, such as central processing units (CPUs) or graphics processing units (GPUs), for example, through low-level APIs included with the container. Generally, containers may be run in any suitable host system and may be migrated from one host system to another as hardware and software compatibility is handled by the host and container layers. This allows for grouping containers to optimize use of the underlying host system. A host controller may also be provided to optimize distribution of containers across hosts.

Modern CPUs may be configured to help distribute CPU processing load across multiple processing cores, therefore allowing multiple computing tasks to execute simultaneously and reduce overall real or perceived processing time. For example, many CPUs include multiple independent and asynchronous cores, each capable of handling different tasks simultaneously. Generally, GPUs, while having multiple cores, can be limited in their ability to handle multiple different tasks simultaneously. A typical GPU can be characterized as a processor which can handle a Single Instruction stream with Multiple Data streams (SIMD) whereas a typical multi-core CPU can be characterized as a processor which can handle Multiple Instruction streams with Multiple Data streams (MIMD). A multi-core CPU or a cluster of multiple CPUs can also be characterized as parallelized SIMD processor(s), thereby in effect simulating a MIMD architecture.

A SIMD architecture is generally optimized to perform processing operations for simultaneous execution of the same computing instruction on multiple pieces of data, each processed using a different core. A MIMD architecture is generally optimized to perform processing operations which requires simultaneous execution of different computing instructions on multiple pieces of data, regardless of whether executing processes are synchronized. As such, SIMD processors, such as GPUs, typically perform well with discrete, highly parallel, computational tasks spread across as many of the GPU cores as possible and making use of a single instruction stream. Many GPUs have specific hardware and firmware limitations in place to limit the ability for the GPU cores to be separated, or otherwise virtualized, thereby reinforcing the SIMD architecture paradigm. CPUs typically have little or no such limitation, thereby making the process of dividing GPU processing time across multiple tasks difficult as compared to CPUs. Rather than attempting this, IaaS providers with GPU resources may need to provide more physical GPUs to handle GPU processing requests and possibly even dedicated GPUs for certain processes, for example, artificial intelligence (AI) workloads, even if the actual computational capacity of that infrastructure far outstrips the GPU compute demand, leading to inflated capital and operating costs associated with offering GPU resources in an IaaS, PaaS, SaaS, or other product or cloud infrastructure offering.

In the case of GPU-heavy workloads such as those demanded by certain AI-enabled offerings, not all AI workloads are the same and hardware optimal for running one AI workload may not be rightly-sized for another AI workload.

Virtualization techniques have emerged throughout the past decades to optimize the utilization of hardware resources such as CPUs by efficiently allowing computing tasks to be spread across multiple cores, CPUs, clusters, etc. However, such virtualization is generally not available or non-performant for GPUs and this can lead to higher operating costs and increased application or platform latency. What is needed is a technique for appropriately scaling a workflow pipeline to handle high-density processing operations (such as AI operations) which require frequent utilization of GPUs during processing.

DETAILED DESCRIPTION

Disclosed are apparatuses, methods, and computer readable media for predicting and allocating virtual resources for workloads. More particularly, but not by way of limitation, this disclosure relates to apparatuses, methods, and computer readable media for a technique for predicting resource requirements of a workload, such as that for an AI application or platform, and matching the workload to an appropriate set of shared computing resources.

In the following description, for purposes of explanation, numerous specific details are set forth in order to provide a thorough understanding of the embodiments disclosed herein. It will be apparent, however, to one skilled in the art that the disclosed embodiments may be practiced without these specific details. In other instances, structure and devices are shown in block diagram form in order to avoid obscuring the disclosed embodiments. References to numbers without subscripts or suffixes are understood to reference all instance of subscripts and suffixes corresponding to the referenced number. Moreover, the language used in this disclosure has been principally selected for readability and instructional purposes, and may not have been selected to delineate or circumscribe the inventive subject matter, resort to the claims being necessary to determine such inventive subject matter. Reference in the specification to "one embodiment" or to "an embodiment" means that a particular feature, structure, or characteristic described in connection with the embodiments is included in at least one embodiment.

The terms "a," "an," and "the" are not intended to refer to a singular entity unless explicitly so defined, but include the general class of which a specific example may be used for illustration. The use of the terms "a" or "an" may therefore mean any number that is at least one, including "one," "one or more," "at least one," and "one or more than one." The term "or" means any of the alternatives and any combination of the alternatives, including all of the alternatives, unless the alternatives are explicitly indicated as mutually exclusive. The phrase "at least one of" when combined with a list of items, means a single item from the list or any combination of items in the list. The phrase does not require all of the listed items unless explicitly so defined.

As used herein, the term "computing system" refers to a single electronic computing device that includes, but is not limited to a single computer, VM, virtual container, host, server, laptop, and/or mobile device or to a plurality of electronic computing devices working together to perform the function described as being performed on or by the computing system.

As used herein, the term "medium" refers to one or more non-transitory physical media that together store the contents described as being stored thereon. Embodiments may include non-volatile secondary storage, read-only memory (ROM), and/or random-access memory (RAM).

As used herein, the term "application" refers to one or more computing modules, programs, processes, workloads, threads and/or a set of computing instructions executed by a computing system. Example embodiments of an application include software modules, software objects, software instances and/or other types of executable code.

For the purposes of this disclosure, the term 'right-sized' (or 'rightly-sized') refers to a hardware and/or software configuration whereby the computing requirements and the hardware capacity are matched so as to optimize for lowest cost per successful computing cycle within a specified range of acceptable latency between initial request and operation completion; whereas cost can be a function of power and cooling required for the given components, opportunity cost in utilizing certain resources at the expense of other, or any combination therein.

Figure 1:
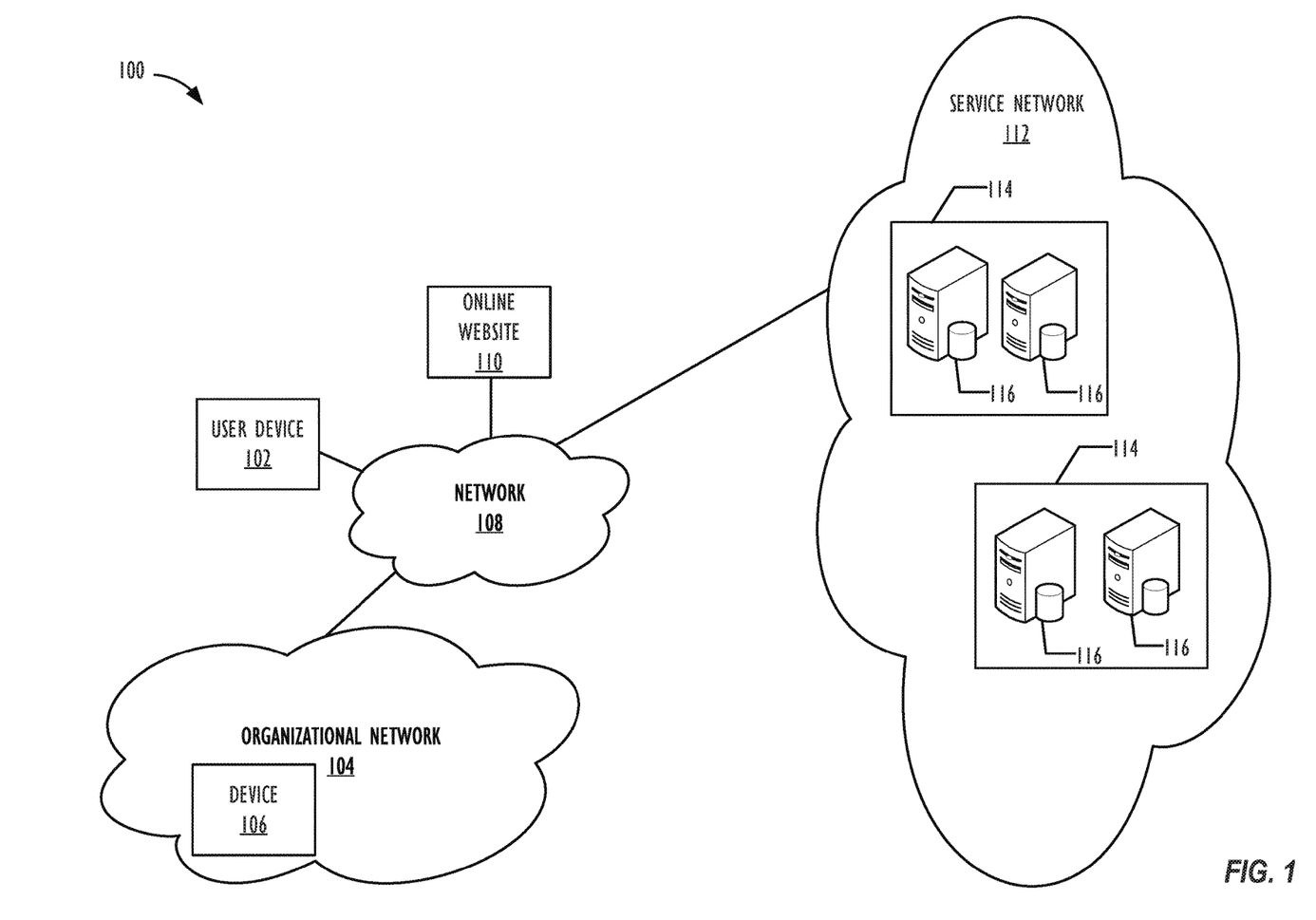
FIG. 1 illustrates a block diagram of an embodiment of a cloud computing system where embodiments of the present disclosure may operate.

FIG. 1 is a schematic diagram of an embodiment of a computing system 100, such as a cloud computing system, where embodiments of the present disclosure may operate herein. Computing system 100 may include a user device 102, an organizational network 104 having one or more devices 106, network 108, such as the internet, an online website 110, and a service network 112. In some embodiments, the organizational network 102 may be a local network, such as local area network (LAN), utilized by a business entity that includes a one or more devices 106 that may include, but are not limited to switches, servers, routers, and various computing devices.

The user device 102 may include, but is not limited to, a mobile device, such as a smartphone, tablet, etc., a personal computer, and a wearable device. The user device 102 is able to communicate with the service network 112 and online website 110. Although not specifically illustrated in FIG. 1, the organizational network 104 may also include a connecting network device (e.g., gateway or router) or a combination of devices that implement a firewall or intrusion protection system and is generally not in direct communications with either the user device 102 or the online website 110, but is configured to communicate with service network 112.

FIG. 1 illustrates that organizational network 104 is coupled to the network 108. The network 108 may include one or more computing networks available today, such as other LANs, wide area networks (WAN), the Internet, and/or other remote networks, in order to transfer data between one or more organizational devices 106. Each of the networks within computing system 100 may contain wired and/or wireless programmable devices that operate in the electrical and/or optical domain. For example, network 108 may include wireless networks, such as cellular networks (e.g., Global System for Mobile Communications (GSM) based cellular network), wireless fidelity (WiFi®) (WIFI is a registered trademark owned by Wi-Fi Alliance Corporation)) networks, and/or other suitable radio based network as would be appreciated by one of ordinary skill in the art upon viewing this disclosure. The network 108 may also employ any number of network communication protocols, such as Transmission Control Protocol (TCP) and Internet Protocol (IP). Although not explicitly shown in FIG. 1, network 108 may include a variety of network devices, such as servers, routers, network switches, and/or other network hardware devices configured to transport data over networks.

In FIG. 1, the service network 112 is a remote network (e.g., a cloud network) that is able to communicate with the user device 102, organizational network 104, and online store 110 via network 108. The service network 112 provides computing resources to the user devices 102 and/or organizational network 104. For example, by utilizing the service network 112, user devices 102 may be able to access services executing in the service network 112. In some embodiments, the service network 112 includes one or more datacenters 114, where each datacenter 114 could correspond to a different geographic location. Each of the datacenter 114 includes a plurality of server instances 116, where each server instance 116 can be implemented on a physical computing system, such as a single electronic computing device (e.g., a single physical hardware server) or could be in the form a multi-computing device (e.g., multiple physical hardware servers). Examples of server instances 116 include, but are not limited to a web server instance, a back-end server instance, a database server instance, and/or a virtualization system hosting VMs or containers.

Figure 2:
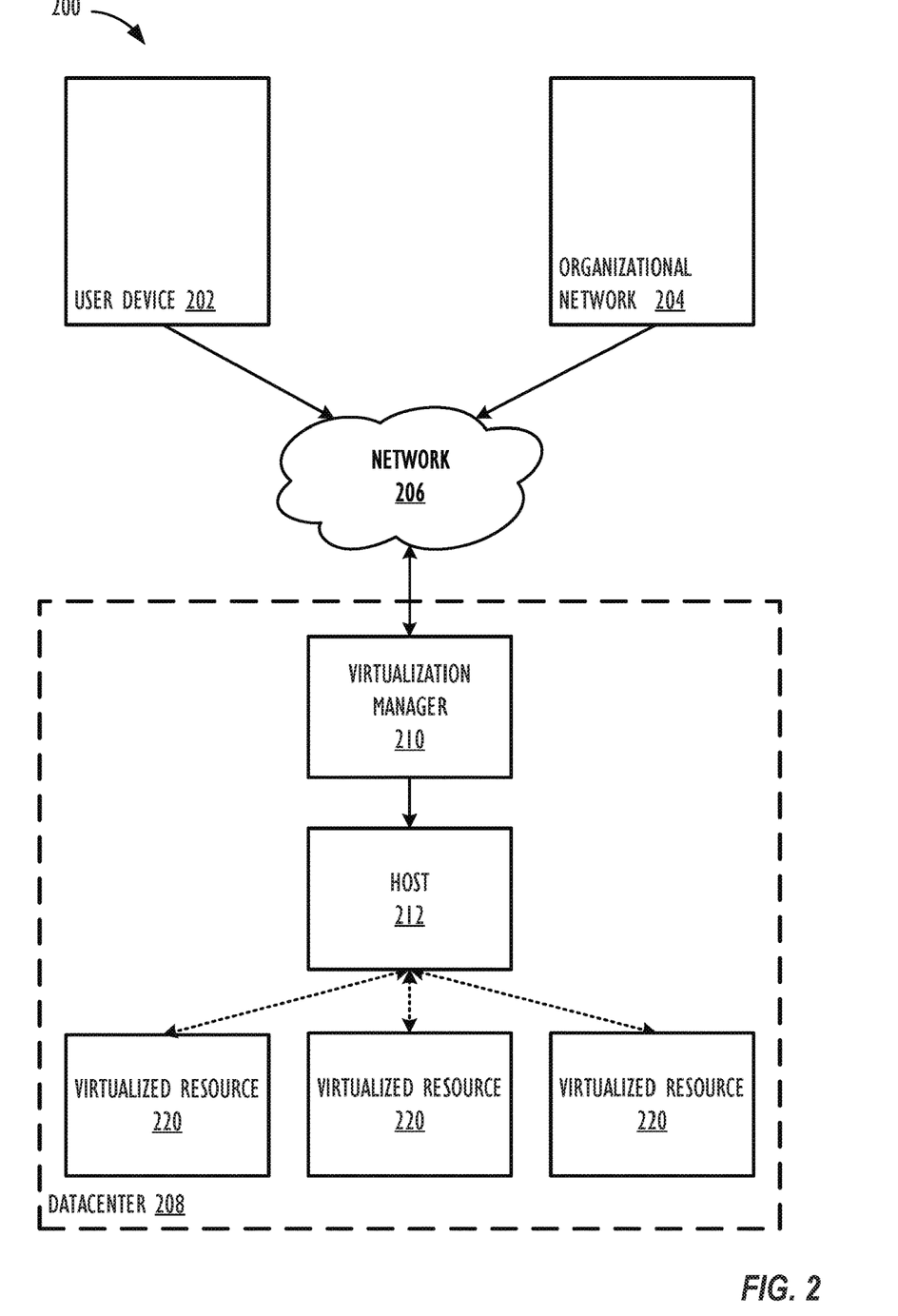
FIG. 2 is a schematic diagram of an embodiment of a system for predicting and allocating resources for workloads, in accordance with aspects of the present disclosure.

FIG. 2 is a schematic diagram of an embodiment of a system 200 for predicting and allocating resources for workloads, in accordance with aspects of the present disclosure. FIG. 2 illustrates a client-server architecture that includes a user device 202, along with an organizational network 204. The user device 202 and retailer device 204 are communicatively coupled via a network 206, such as the internet, to datacenter 208. Datacenter 208 may include a virtualization manager 210 which may distribute requests for resources to host 212 and on to one or more VRs 220 running on the host 212. VRs 220 may be started and/or configured by the host 212 or virtualization manager 206. Datacenter 208, network 204, and user device 202, may be substantially similar to datacenter 114, network 108, and user device 102, as described in FIG. 1, respectively.

Although FIGS. 1 and 2 illustrate specific embodiments of a cloud computing system 100 and a system 200 for predicting and allocating resources for workloads, respectively, the disclosure is not limited to the specific embodiments illustrated in FIGS. 1 and 2. For instance, although FIG. 1 illustrates that the service network 112 is implemented using data centers, other embodiments of the of the developmental platform network 112 are not limited to data centers and can utilize other types of remote network infrastructures. Moreover, other embodiments of the present disclosure may combine one or more different server instance into a single server instance. Using FIG. 2 as an example, the virtualization manager 210, host 212, and one or more VRs 220 can be combined into a single server instance. Alternatively functions of the virtualization manager 210 may be performed by multiple computing devices or server instances. The use and discussion of FIGS. 1 and 2 are only examples to facilitate ease of description and explanation and are not intended to limit the disclosure to the specific examples.

Figure 3:
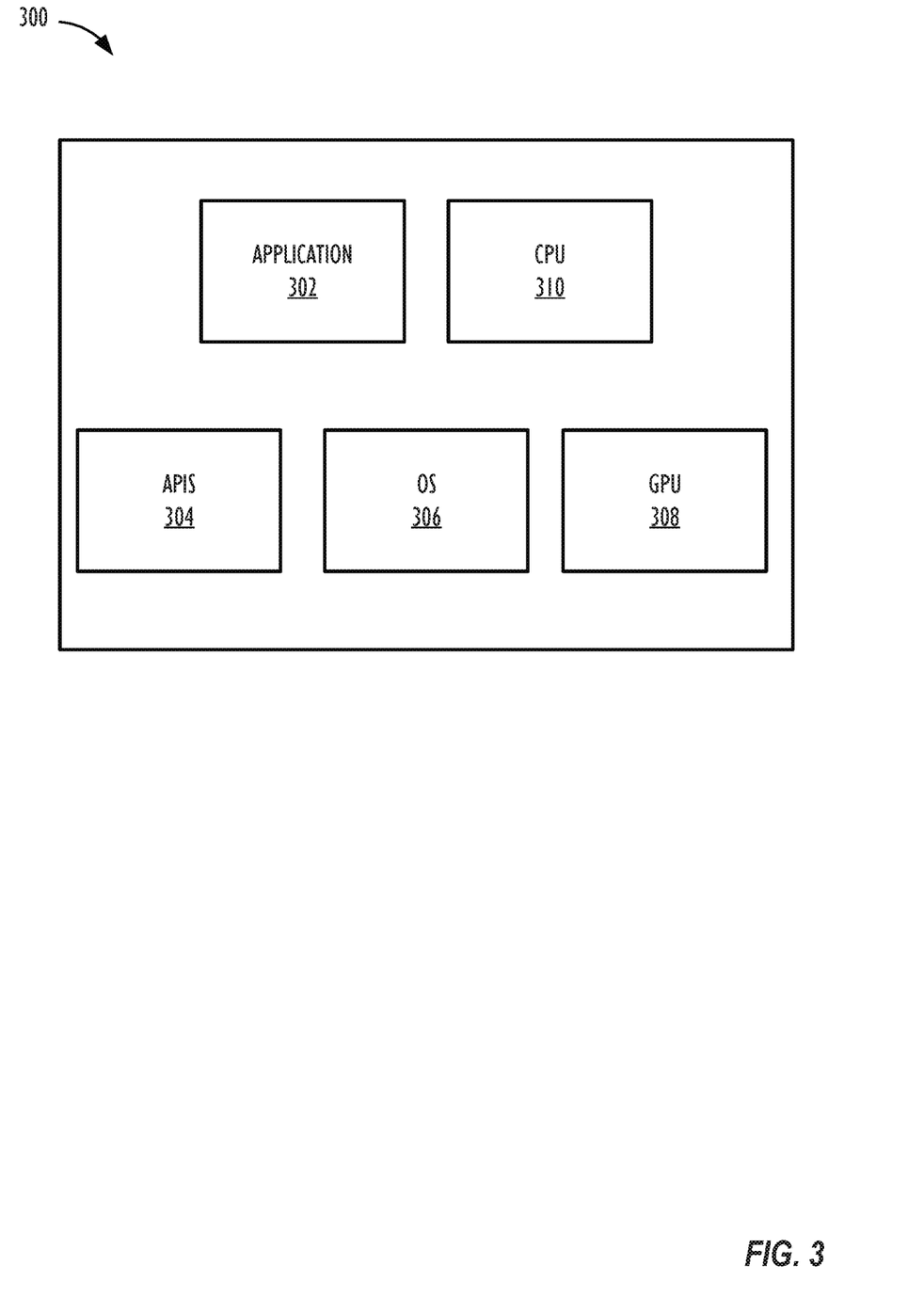
FIG. 3 is a schematic diagram of a VR, in accordance with aspects of the present disclosure.

FIG. 3 is a schematic diagram of a VR 300, in accordance with aspects of the present disclosure. The VR 300 may be instantiated by a host based on a request by a virtualization manager to run application 302, which may call APIs 304 operating on OS 306. A VR also may access GPU 308 and one or more CPUs 310. In certain cases, a VR may also contain a field-programmable gate array (FPGA), AI processor, neural processor, neural network processor, or other such hardware device. Where the VR 300 has access to the GPU 308, the OS may include drivers (not shown) sufficient to interact with the GPU 308. This driver may include a graphics buffer with may accumulate GPU draw calls. The graphics buffer may flush commands to the GPU 308 after a time interval passes, the buffer is filled, or an explicit flush command is received. Examples of the VR 300 include VMs and containers. Containers are similar to VMs but rather than virtualizing an entire computing system, the container generally only contains a minimal OS and APIs needed to run the application.

As indicated above, a single computing device may be capable of hosting many VRs. The ability to host multiple VRs by a single computing device is helped by the parallel architecture of modern central processing units (CPUs). Generally, modern CPUs are configured to include multiple processing cores, each core capable of functioning asynchronously and independently in a parallelized SIMD architecture which allows the CPU to functionally mimic a MIMD architecture, this ability helps increase parallelism by allowing the CPU to execute multiple instructions of different data, allowing CPUs processing time to be chopped up and spread across multiple tasks, such as for VRs. By spreading CPU processing time across multiple tasks, use of the CPU may be optimized and the total number of CPUs or physical servers needed for a given number of tasks, reduced.

Generally, GPUs have a very different single instruction, multiple data (SIMD) architecture as compared to CPUs. This architecture difference is due to graphics processing involving a different workload than that seen by CPUs, traditionally involving performing a set of calculation for each pixel on the screen in a pixel pipeline, representing parallel processing of a single instruction. Programmable pipelines increased the flexibility of these pipelines, allowing for more complex shading and other graphics functions to be performed in the pipeline. Increasingly, these programmable pipelines in GPUs are being harnessed by scientific and artificial intelligence (AI) workloads. Scientific and AI workloads often can be highly parallelized and may run faster on GPUs than on CPUs as often such workloads apply specific logical operations on a large amount of data in parallel.

Figure 4:
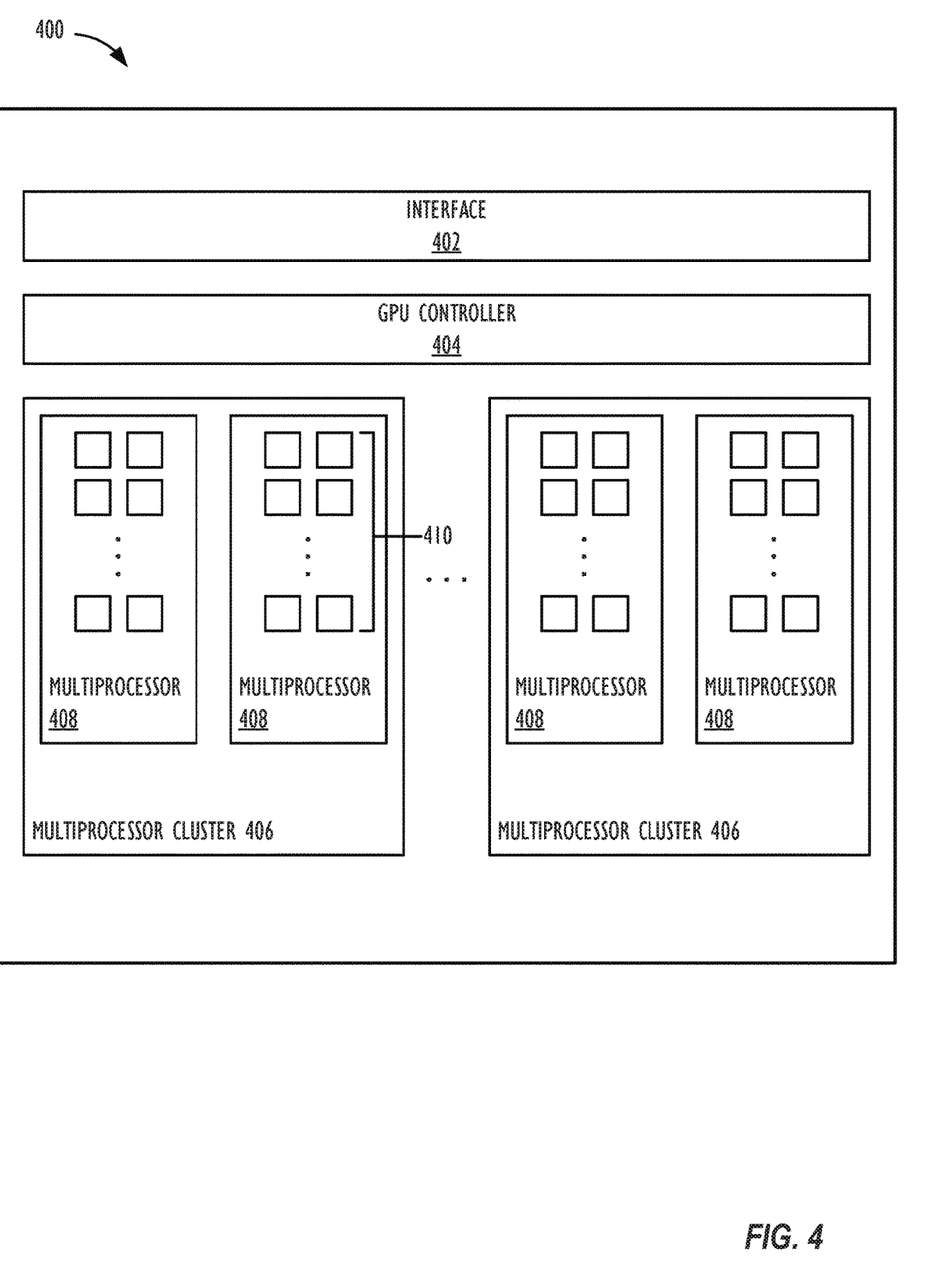
FIG. 4 is a schematic diagram of a GPU, in accordance with aspects of the present disclosure.

FIG. 4 is a schematic diagram of a GPU 400, in accordance with aspects of the present disclosure. GPU 400 includes an interface which receives commands flushed from the GPU driver. These commands may be passed on to a GPU controller 402. The GPU controller 402 may parse the commands and assign work to one or more multiprocessor clusters 406. The multiprocessor clusters 406 may further divide up the work into threads and assign the threads to the one or more multiprocessors 408. The multiprocessors

408 may schedule the threads to groups of cores 410 for execution. In some cases, this execution may be a batch execution process where threads are assigned and executed in lockstep. GPUs typically only include a very small number, typically one, GPU controller 402. Due at least in part to the complexity of coordinating hundreds or thousands of cores in certain GPUs, the ability of the GPU controller 402 to accept and track batches of work limits the ability or speed of the GPU to handle multiple tasks with differing sets of data that needs to be loaded from memory. This in turn limits the ability of GPUs to be virtualized to handle multiple tasks from different sources. Similarly, certain CPUs, field-programmable gate array (FPGA), AI processor, neural network processor, or other such hardware device may also have similar such architectural limitations.

Figure 5:
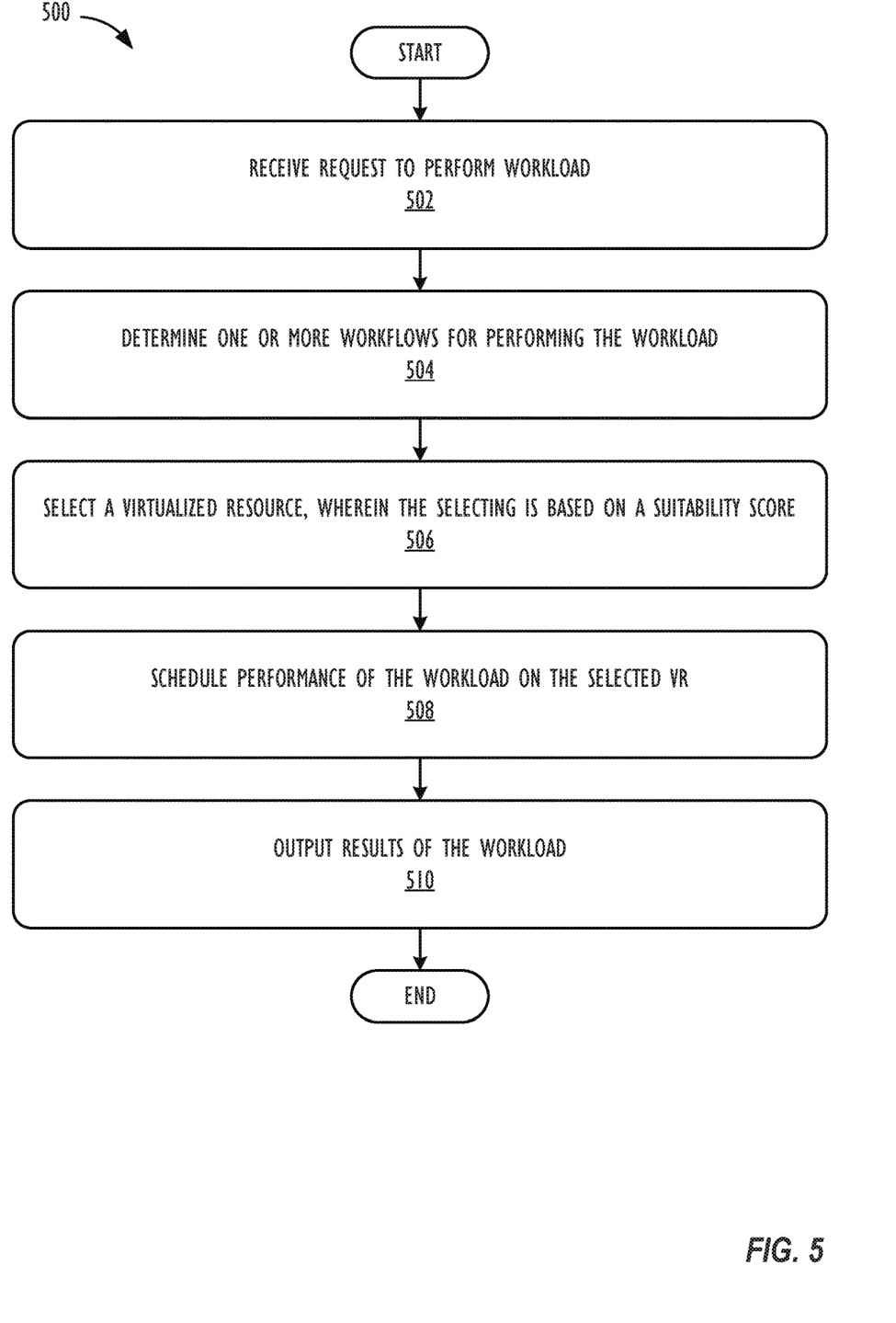
FIG. 5 is a flowchart illustrating a method for allocating computing resources, in accordance with aspects of the present disclosure.

FIG. 5 is a flowchart illustrating a method 500 for allocating computing resources, in accordance with aspects of the present disclosure. At block 502, a request to perform a workload is received. For example, a request may be received for a workload to process an image and identify the objects in the image. At block 504, one or more workflows may be determined to perform the workload. For example, based on the request to identify the objects in the image, a determination may be made to run one or more workflows, such as a set of AI models, to identify potential objects in the image.

At block 506, one or more VRs may be selected to run a workflow, such a model. The VRs may be associated with a designated hardware configuration. According to certain aspects, VRs, such as a VM or container, may be configured to run on certain hardware components, such as a type of GPU. For example, container A may be configured to run on hardware including a particular GPU, such as a NVidia® V100 (NVidia is a registered trademark owned by NVIDIA Corporation), container B may include a P100, container C a Titan X, container D an AMD FirePro® (AMD FirePro is a registered trademark owned by Advanced Micro Devices, Inc.), and so forth. Each model of the set of AI models may be associated with a suitability score for each VR capable of running the model. This suitability score may be determined based at least in part on a set of performance benchmarks for the model running on each of the VRs. These performance benchmarks may measure various aspects of how a particular model runs on the VR, such as speed, throughput, GPU utilization rate, power consumption, etc. Based on the suitability score, a VR may be selected to run the workflow.

In certain cases, hardware such as GPUs may be associated with a suitability score for each model independently of a particular VR. For example, hardware, such as a GPU, FPGA, AI processor, neural network processor, etc., may be assessed for a workflow in a way that is generic to a set of VRs. A particular VR may be configured to include a GPU as needed based on the assessment and expected workflow. VRs may also be selected and adjusted based on an expected workload. For example, for a non-real-time workload including a relatively large number of workflows, a relatively large number of VRs may be instantiated with relatively lower power hardware as the workload may be handled more efficiently by multiple hardware devices rather than a single, more powerful device. In another example, a real-time workload with a relatively fewer number of workflows may be handled by a single VR and relatively fewer number of higher power hardware. This single VR may be further adjusted to include hardware dynamically, for example, if a workflow executes especially efficiently on a particular hardware device, or additional hardware resources is expected to help perform the workflow.

At block 508, the workflow is scheduled to run on the selected VR. Once a VR is selected, the workflow may be scheduled to run on the virtualized resource. After the run is completed, at block 510, the output of the run is returned.

Figure 6:
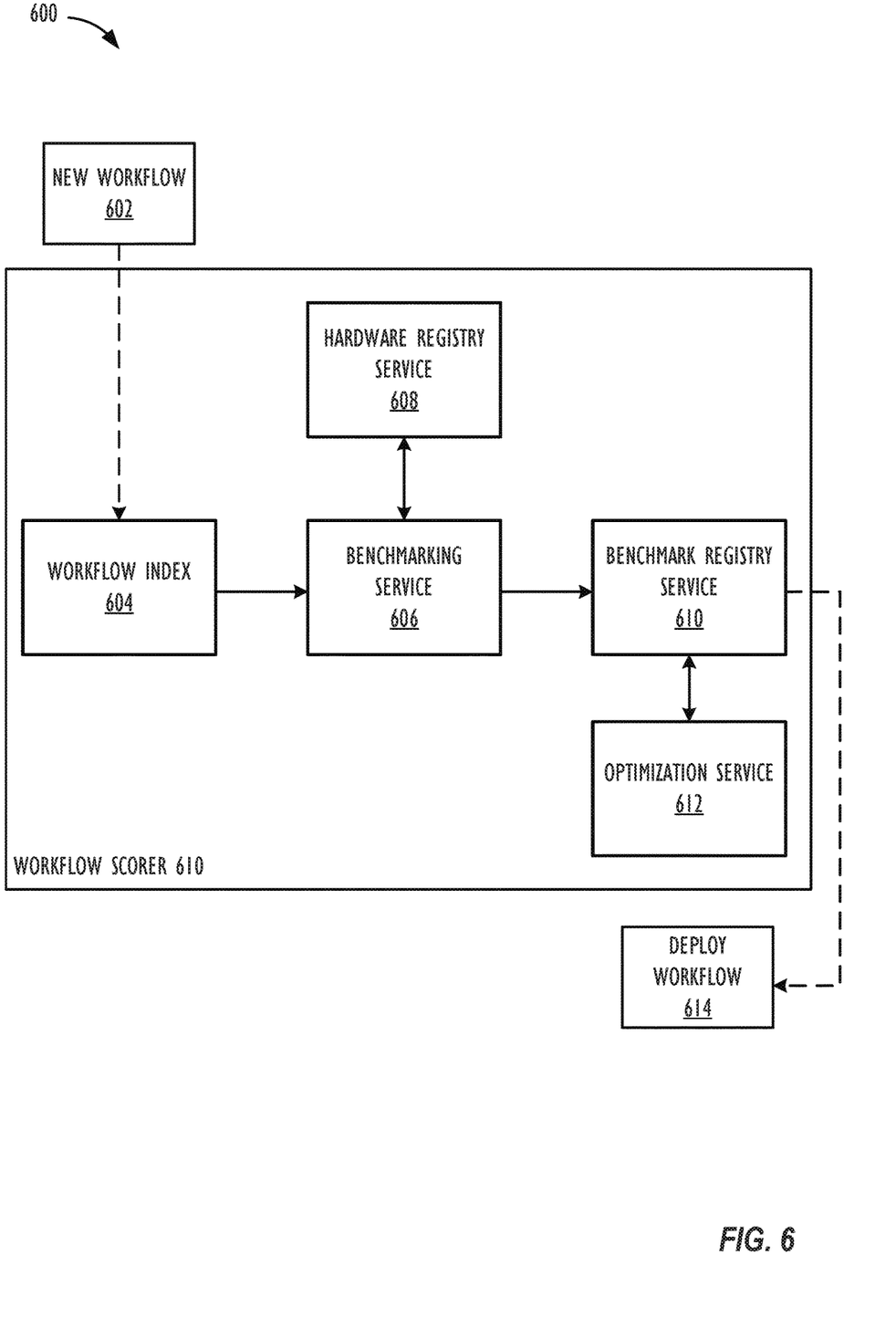
FIG. 6 is a schematic diagram of an embodiment of a workflow scoring system, in accordance with aspects of the present disclosure.

FIG. 6 is a schematic diagram of an embodiment of a workflow scoring system 600, in accordance with aspects of the present disclosure. According to certain aspects, a new workflow 602 may be added to a workflow index 604. New workflows 602, such as a new AI model, may be added to run on VRs and these new workflows may be processed to determine which VRs are most suitable for the new workflows 602. The new workflows 602 may be processed to generate a suitability score and this processing may be performed either prior to deploying the new workflows 602 for general use, or concurrent to deployment of the new workflow 602 for general use. The workflows available for use are tracked by the workflow index 604.

Figure 7A:
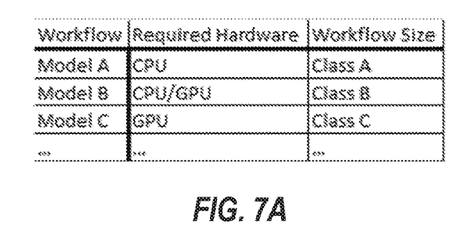
FIG. 7A-C show example data utilized for determining a suitability score, in accordance with aspects of the present disclosure.

The workflow index 604 is discussed in conjunction with FIG. 7A, which illustrates an example workflow index, in accordance with aspects of the present disclosure. The workflow index 604 maintains a list of the workflows available to be run on VRs as well as information about the workflows. In certain cases, the list of workflows in the workflow index 604 may not be concurrent with the workflows deployed for use, but may include newly added workflows 602 that are being processed for deployment. The information about the workflows may include an indication of what hardware is required to run a particular workflow. For example, model A may be a CPU specific workflow, model C requires a GPU to run on, while model B can run on either a CPU or GPU. The information about the workflow may also include information on how much the memory is needed to run the model (e.g. workflow size). Models generally have a feature index for use by the model to recognize various features. Having this entire index loaded and accessible in memory generally greatly speeds up running the model as there is no need to swap data in and out of memory from longer-term storage. According to certain aspects, how much memory is needed may be determined based, at least in part, on the size of the feature index for a given model. The workflow size information may be bucketed into multiple size categories. For example, memory class C may include workflows which require X-Y GBs of memory, class B may include workflows which require Y-Z GB, and class A may include workflows which require greater than Z GB. In certain cases, these memory classes may be organized around common memory sizes of GPUs. As another example, certain workflows, such as those processing videos, may be limited to GPUs with a larger number of cores due to amount of information to be processed in videos. Additional limitations may apply, for example, based on data file type of a workload, data file size, core pipeline depth, etc. The workflow index 604 may be stored, for example, in a file system or database of computing devices hosted in a datacenter, such as a virtualization manager.

Figure 7B:
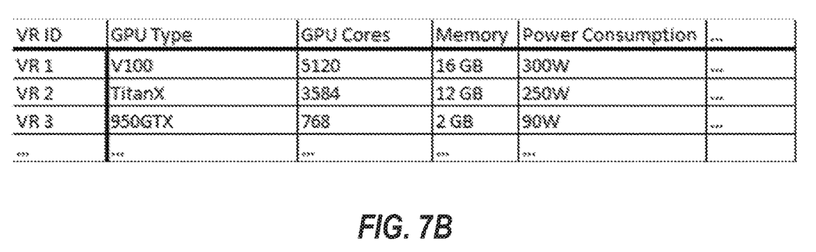

Returning to FIG. 6, information related to the hardware configuration of available host computing devices may be maintained in a hardware registry 608. An example of the hardware registry service 608 is illustrated in FIG. 7B, in accordance with aspects of the present disclosure. The hardware registry service 608 may be stored, for example, in a file system or database. Information related to the hardware configuration may contain various information about host hardware, including device level information, as well information specific to particular components of a device, such as a GPU, CPU, field-programmable gate array (FPGA), AI processor, neural network processor, or other such hardware device. For example, the hardware registry service 608 may include information related to GPUs, such as a GPU type or model, number of cores, GPU memory available, power consumption, etc. This information may be obtained, for example, by querying one or more hardware components, an OS, etc. This information may also include some basic benchmarking information about the hardware, such as floating point operations per second (FLOPS) at single precision, double precision, etc. This information may be obtained, for example, by running commonly available benchmarking tools on the hardware. Hardware information may be maintained based on how hardware is allocated to the VRs, or just based on the hardware available.

Figure 7C:
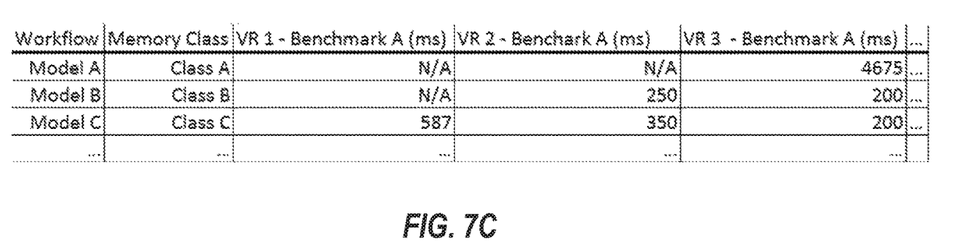

Benchmarking information of each VR as against the workflows may be obtained by a benchmarking service 606 and stored in a benchmark registry service 610, an example of which is illustrated in FIG. 7C, in accordance with aspects of the present disclosure. While described based on VRs available, benchmarking information may also be based on hardware components available and VRs may be defined, either in advance, or on instantiation, to include access to specific hardware components. According to certain aspects, the benchmarking service runs the available workflows on compatible hardware to generate a set of benchmark scores of the model for the compatible hardware. These benchmark scores may be separate from the basic hardware benchmarking information in the hardware registry 608. The benchmark registry service 606 may obtain workflow information from the workflow index 604 and hardware configuration information from the hardware registry 608 to determine which workflows are compatible for which hardware configurations. For example, as seen in FIG. 7C, model B may require greater than Y GB of GPU memory and is not compatible with VR 3, which includes only Y GB of GPU memory. For each compatible hardware configuration, the benchmark registry service 606 may run the model on the hardware configuration to generate a set of performance benchmarks, such as percentage of resources used, average run times, power used, etc. for the hardware configuration.

Generally, a new workflow may be submitted along with information and resources sufficient to run the workflow. For example, a new facial recognition model may be submitted along with information as to how and in what circumstances to trigger the model, along with sample images to run the model against. These information and resources may be used to generate the set of performance benchmarks for the workflow for each of the hardware configurations. For example, models may be submitted as seen in FIG. 7C, model C may be run against sample images and the time required to run the model may be measured and recorded as benchmark A as against each supported hardware configuration (VR 1-VR 3 in this example). Similarly, additional benchmarks may be measured and recorded, such as power used, utilization percentage, etc. In certain cases, the performance benchmarks may also be generated separately and submitted along with a new model.

Information in the benchmark registry service 610 may be consumed by the optimization service 612. The optimization service 612, in some cases, may be implemented as a machine learning service, such as a support vector machine, configured to optimize a selection of a VR for which to run a workflow on. In certain cases, the optimization service 612 may optimize the selection of the VR for lowest cost. Cost may be a function of power, speed, and throughput. Performance benchmarks of the different hardware configurations may be analyzed to determine a suitability score for each workflow as against each hardware configuration. This suitability score may be a fitting of the performance benchmarks of the benchmark registry 610 against a metric of cost by the optimization service 612. For example, a relatively simple model may run very quickly on a very powerful GPU, but the suitability score may be relatively low due to a high amount of unused GPU cycles and power consumed, as compared to another, less powerful GPU, which ran the model slower, but with very few unused GPU cycles and lower power consumption. The suitability score may be fed back into and stored in the benchmark registry 610. In certain cases, the optimization service 612 may optimize for a speed metric, for example in the case of a real-time workflow, or throughput, for example where multiple chained workflows are needed, and generate suitability scores for those optimizations as well. For example, a model, for a particular hardware configuration may having multiple associated suitability scores for different optimization metrics, such as lowest cost, highest speed, etc. The suitability scores may then be used to optimize selection of a VR for a given workflow depending on the expected use case of the workflow.

After suitability scores for a new workflow 602 are generated, the new workflow may be deployed at block 614. In certain cases deployment of the new workflow 602 may occur prior to generating suitability scores for the new workflow 602. For example, new workflow 602 may be deployed before generation of suitability scores in a particular mode, such as a preliminary mode, with certain limitations, such as increased pricing, limitations on which hardware configurations may be used, time constraints, etc. Suitability scores for the new workflow 602 may be generated during or after deployment of the workflow, and as, or after, the suitability scores become available, these restrictions may be lifted.

Figure 8:
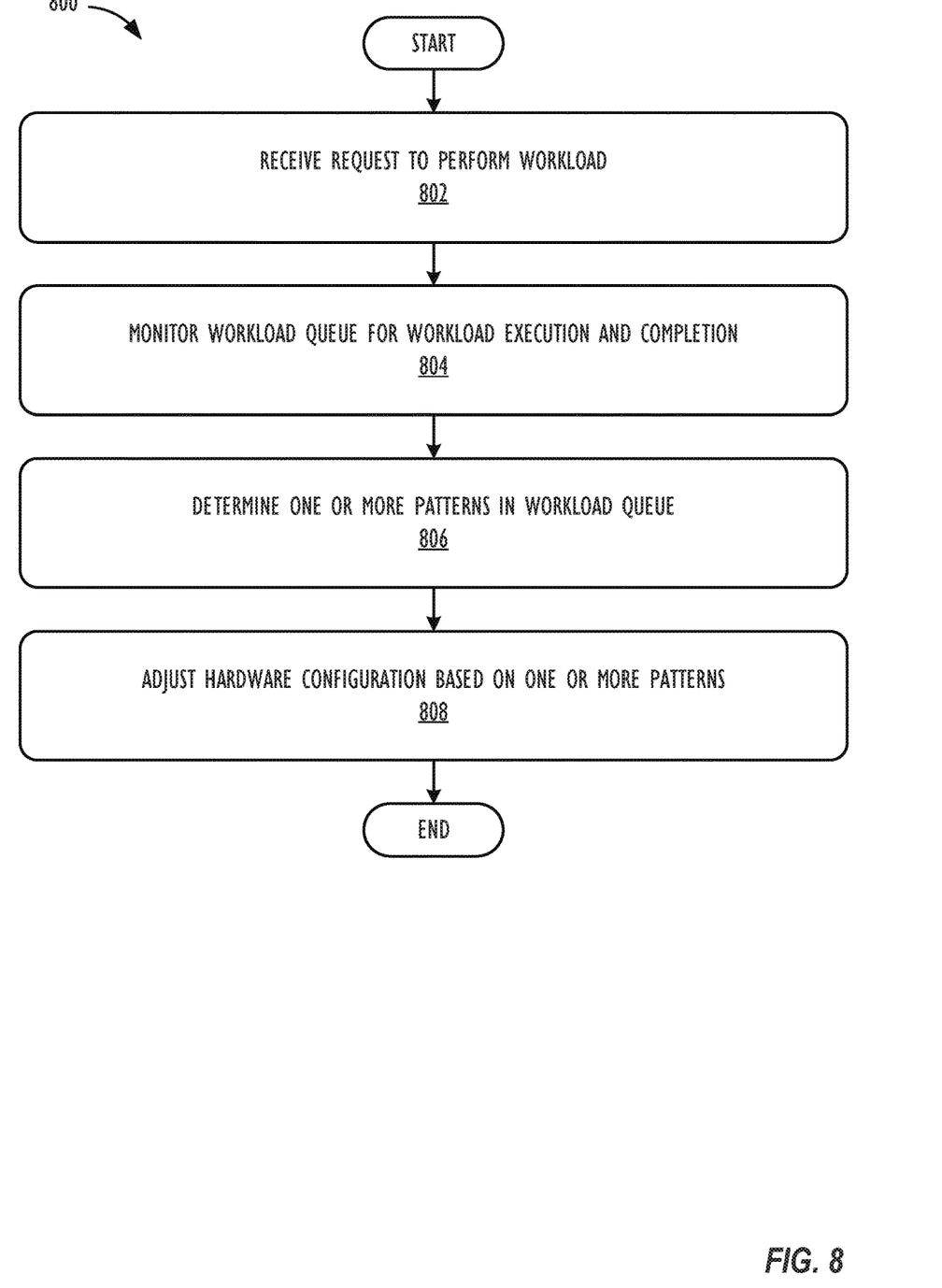
FIG. 8 is a flowchart illustrating a method for monitoring and adjusting computing resources, in accordance with aspects of the present disclosure.

FIG. 8 is a flowchart 800 illustrating a method for monitoring and adjusting computing resources, in accordance with aspects of the present disclosure. At block 802, a request to perform a workload is received. A watcher service monitoring workflow queue may monitor and record metrics for receiving a workload and placing the workflows associated with the workload on the queue. At block 804, monitoring the workload queue to determine when a workflow is executed and completed. The watcher service may monitor the queue to determine and record metrics related to when workflows are assigned to, processed by what VRs or hardware resources, and when the workflow is completed. The watcher may also monitor and record metrics related to the workflow queue, such as number of workflows on the queue, time on the queue, workflow activity per hardware resource, etc. At block 806, one or more patterns in the workload queue may be determined. For example, the watcher may have a historical view of how long items on the queue generally takes to run from the time a workload is received, broken down to one or more workflows on the queue, and the workflows run, as well what is being put on the queue. The watcher may then determine patterns based on these observations of the workflow queue. For example, a watcher may determine that historically the workflows on the queue take a certain amount of time to process and as a large workload has just been received, more hardware resources may be required. At block 808, a hardware configuration may be adjusted based on the one or more patterns. The watcher may then adjust the hardware resources available, for example, by initializing a container or VM, adding a hardware resource to an existing VR, etc.

Figure 9A:
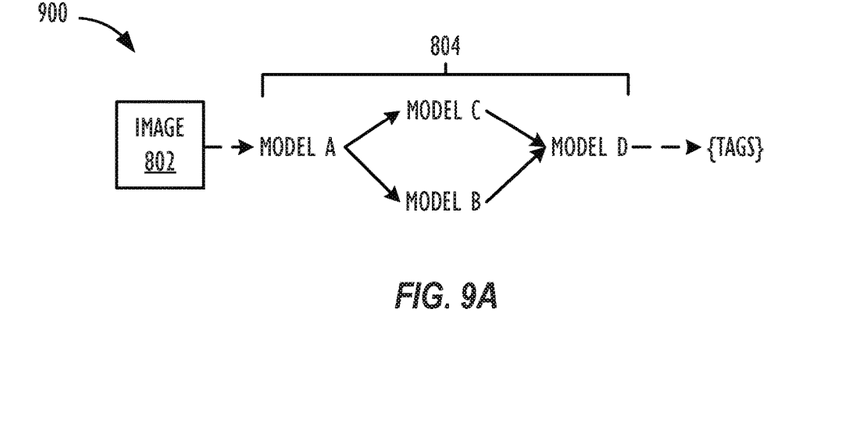
FIG. 9A illustrates an example workload, in accordance with aspects of the present disclosure.

FIG. 9A illustrates an example workload process 900, in accordance with aspects of the present disclosure. According to certain aspects, a request may be received to analyze objects in an image 902. A workload 904 may be selected based on information in the request. This information may be, for example, an explicit request for a particular workload, or, as another example, based on a type of data in the request. The workload 904 may comprise a set of workflows for execution, here starting with Model A. The workload 904 may be branching, for example, based on the outcome of Model A, either Model C or Model B may be run, followed by Model D. The output of the workload 904 is a set of tags describing properties of the image 902, such as whether the image 902 contains cats, or is of a smiling person. Additional processing may also occur, but that is outside the scope of the current disclosure.

Figure 9B:
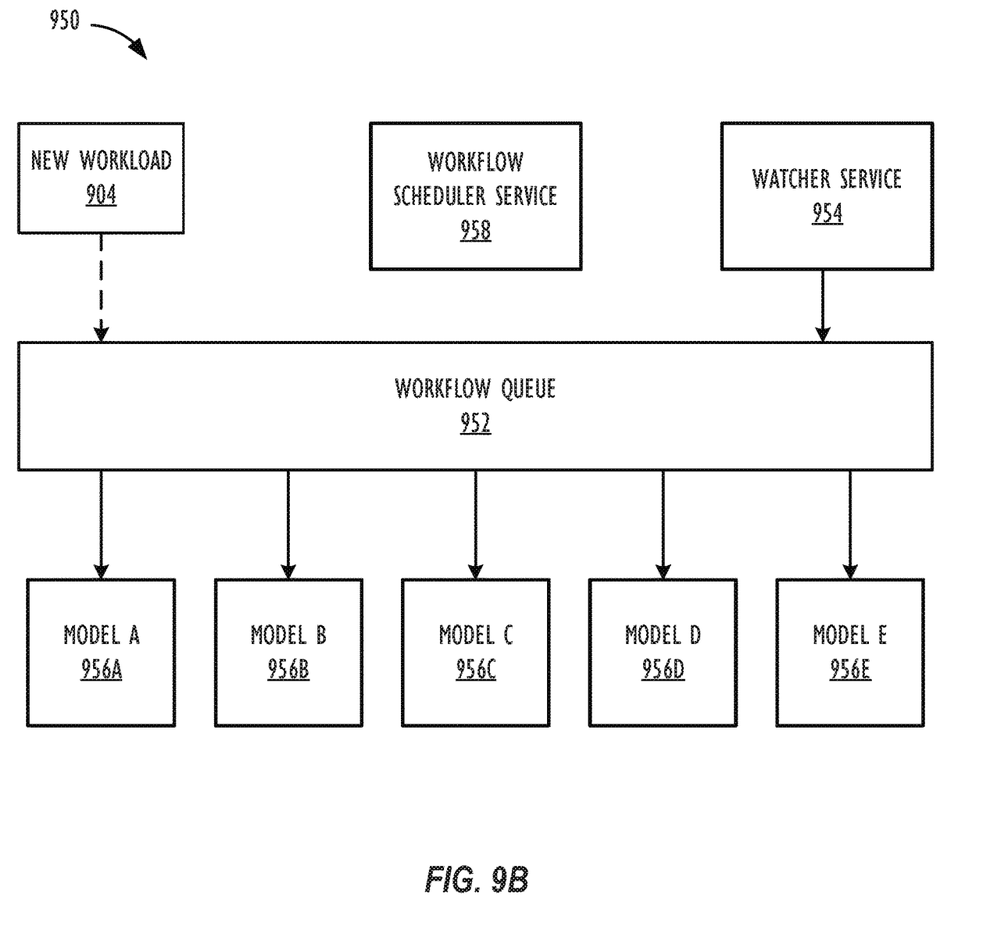
FIG. 9B schematic diagram of an embodiment of a predictive workload pipeline, in accordance with aspects of the present disclosure.

FIG. 9B is a schematic diagram of an embodiment of a predictive workload pipeline 950, in accordance with aspects of the present disclosure. Once a workload 904 is determined, the workload 904 may be passed into a workflow queue 952 to be run. A watcher service 954 monitors workflow activity, here for model A-model E (956A-956E) and plots the workflow activity. While labelled and referred to as models, the workflows 956A-956E run within the context of a VR configured to run the respective model. Additionally, the watcher service 954 monitors workflows being placed into the queue to correlate workflow activities across the workflows for patterns.

Figure 10:
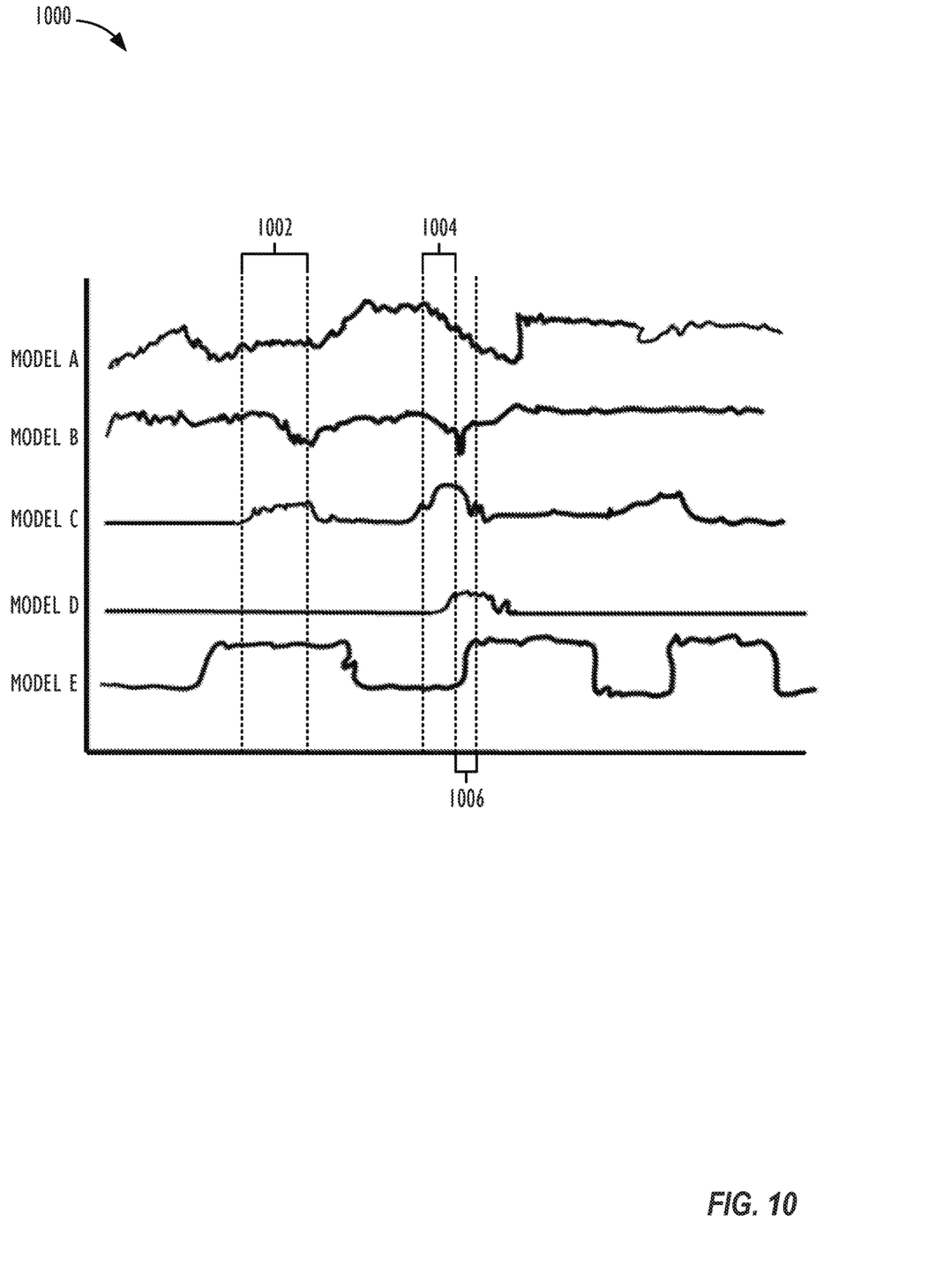
FIG. 10 is a plot of workflow activity, in accordance with aspects of the present disclosure

FIG. 10 is a plot 1000 of workflow activity, in accordance with aspects of the present disclosure. The plot 1000 illustrates workflow activity for model A-model E as the models run. The watcher service 954 analyzes the workflow activities to determine patterns in the workflow activities. In this example, a decrease in workflow activity for model B correlates with an increase in workflow activity for model C at period 1002 and 1004. Similarly, at period 1006 an increase in workflow activity for model B correlates with a decrease in activity for model C. These patterns in workflow activities across workflows may also be correlated with workloads and data on the workflow queue 952. Based on the patterns and correlated workloads and data on the workflow queue 952, the watcher service 954 informs a workflow scheduler service 958 to load or unload various workflows, for example, by starting or stopping VRs and scheduling workflows for execution on the appropriate VRs. In determining which workflows and corresponding VRs to start, the workflow scheduler service 958 may reference the benchmark registry service to determine which workflow VRs are best suited for the expected workflows. As an example, model B may be running efficiently on a less capable VR, such as VR 3. An decrease in workflow activity may then be observed for model B, which is known to be correlated with increased workflow activity in model C. A more capable VR, such as VR 1 may be started in response. VR 1 may be less suitable for running model B as VR 1 as model B running on VR 1 results in a relatively large number of unused GPU cycles. However, those unused cycles may make VR 1 more suited to run both model B and model C efficiently than separate VRs.

In the foregoing description, for purposes of explanation, numerous specific details are set forth in order to provide a thorough understanding of the disclosed embodiments. It will be apparent, however, to one skilled in the art that the disclosed embodiments may be practiced without these specific details. In other instances, structure and devices are shown in block diagram form in order to avoid obscuring the disclosed embodiments. References to numbers without subscripts or suffixes are understood to reference all instance of subscripts and suffixes corresponding to the referenced number. Moreover, the language used in this disclosure has been principally selected for readability and instructional purposes, and may not have been selected to delineate or circumscribe the inventive subject matter, resort to the claims being necessary to determine such inventive subject matter. Reference in the specification to "one embodiment" or to "an embodiment" means that a particular feature, structure, or characteristic described in connection with the embodiments is included in at least one disclosed embodiment, and multiple references to "one embodiment" or "an embodiment" should not be understood as necessarily all referring to the same embodiment.

It is also to be understood that the above description is intended to be illustrative, and not restrictive. For example, above-described embodiments may be used in combination with each other and illustrative process steps may be performed in an order different than shown. Many other embodiments will be apparent to those of skill in the art upon reviewing the above description. The scope of the invention therefore should be determined with reference to the appended claims, along with the full scope of equivalents to which such claims are entitled. In the appended claims, terms "including" and "in which" are used as plain-English equivalents of the respective terms "comprising" and "wherein."

What is claimed is:

1. A system for allocating virtualized resources, comprising:
one or more non-transitory memory devices; and
one or more hardware processors configured to execute instructions from the one or more non-transitory memory devices to cause the system to:
configure a plurality of virtualized resources with hardware configurations based on artificial intelligence (AI) models executable by each of the plurality of virtualized resources;
receive a request to perform a workload,
wherein the workload comprises detecting one or more objects and one or more persons in an image, analyzing the one or more objects and the one or more persons in the image, and identifying the one or more objects and the one or more persons in the image;
determine one or more workflows for performing the workload,
wherein the one or more workflows comprises a set of the AI models;
select a virtualized resource from the plurality of virtualized resources to run the one or more workflows based on a suitability score,
wherein the suitability score for each of the plurality of virtualized resources is associated with each of the set of the AI models, and
wherein the suitability score is selected based on one or more benchmark scores of the one or more workflows;
schedule a performance of at least part of the workload on the selected virtualized resource;
output results of the at least part of the workload, wherein the results comprise a set of tags describing properties of the image;
monitor a workload queue for the plurality of virtualized resources for metrics associated with assigning and processing the one or more workflows and additional workflows with corresponding ones of the plurality of virtualized resources; and adjust the hardware configurations for the plurality of virtualized resources based on the metrics from the monitored workload queue.

2. The system of claim 1, wherein the instructions from the one or more non-transitory memory devices further cause system to:

store a list of the one or more workflows available to run on the plurality of virtualized resources in a workflow index, wherein the workflow index is loaded in a memory to speed up in running one or more AI models.

3. The system of claim 1, wherein the selected virtualized resource is associated with at least one of an AI processor or a neural network processor, and wherein the selected virtualized resource utilizes a graphics processing unit (GPU).

4. The system of claim 1, wherein the one or more benchmark scores are determined based on benchmarked runs of the one or more workflows on the hardware configurations and are stored in a benchmark registry.

5. The system of claim 4, wherein the instructions from the one or more non-transitory memory devices further cause the system to:

retrieve information from the benchmark registry;

implement an optimization service as a machine learning service to consume the information; and optimize, based on the consumed information, the selection of the virtualized resource for a cost metric that includes power, speed, and throughput.

6. The system of claim 5, wherein the instructions from the one or more non-transitory memory devices further cause the system to:

analyze performance benchmarks of different ones of the hardware configurations; and determine the suitability score for each of the one or more workflows against each of the different ones of the hardware configurations.

7. The system of claim 6, wherein the suitability score is further determined based at least in part on a fitting of the performance benchmarks against the cost metric by the optimization service.

8. The system of claim 1, wherein the instructions from the one or more non-transitory memory devices further cause the system to:

select the virtualized resource based at least in part on a determination of memory requirements of an AI model of the set of the AI models.

9. A method for allocating computing resources, comprising:

configuring a plurality of virtualized resources with hardware configurations based on artificial intelligence (AI) models executable by each of the plurality of virtualized resources;

receiving a request to perform a workload, wherein the workload comprises identifying one or more objects and one or more persons in an image, analyzing the one or more objects and the one or more persons in the image, and identifying the one or more objects and the one or more persons in the image;

determining one or more workflows for performing the workload, wherein the one or more workflows comprises a set of the AI models;

selecting a virtualized resource from the plurality of virtualized resources based on a suitability score, wherein the suitability score for each of the plurality of virtualized resources is associated with each of the set of the AI models;

selecting the suitability score based on one or more benchmark scores of the one or more workflows;

scheduling a performance of at least part of the workload on the selected virtualized resource;

outputting results of the at least part of the workload, wherein the results comprise a set of tags describing properties of the image;

monitoring a workload queue for the plurality of virtualized resources for metrics associated with assigning and processing the one or more workflows and additional workflows with corresponding ones of the plurality of virtualized resources; and adjusting the hardware configurations for the plurality of virtualized resources based on the metrics from the monitored workload queue.

10. The method of claim 9, further comprising:

storing a list of the one or more workflows available to run on the plurality of virtualized resources in a workflow index, wherein the workflow index is loaded in a memory to speed up in running one or more AI models.

11. The method of claim 9, wherein the selected virtualized resource is associated with at least one of an AI processor or a neural network processor, and wherein the selected virtualized resource utilizes a graphics processing unit (GPU).

12. The method of claim 9, wherein the one or more benchmark scores are determined based on benchmarked runs of the one or more workflows on the hardware configurations and are stored in a benchmark registry.

13. The method of claim 12, further comprising:

retrieving information from the benchmark registry;

implementing an optimization service as a machine learning service to consume the information; and optimizing, based on the consumed information, the selection of the virtualized resource for a cost metric that includes power, speed, and throughput.

14. The method of claim 13, further comprising:

analyzing performance benchmarks of different ones of the hardware configurations; and determining the suitability score for each of the one or more workflows against each of the different ones of the hardware configurations, wherein the suitability score is further determined based at least in part on a fitting of the performance benchmarks against the cost metric by the optimization service.

15. The method of claim 9, further comprising:

selecting the virtualized resource based at least in part on a determination of memory requirements of an AI model of the set of the AI models, and outputting results that include a set of tags describing properties of the image.

16. A non-transitory machine readable-medium, on which are stored instructions for allocating hardware resources, comprising instructions that when executed cause a machine to:

configure a plurality of virtualized resources with hardware configurations based on artificial intelligence (AI) models executable by each of the plurality of virtualized resources;

receive a request to perform a workload, wherein the workload comprises detecting one or more objects and one or more persons in an image and identifying the one or more objects and the one or more persons in the image;

determine one or more workflows for performing the workload, wherein the one or more workflows comprises a set of the AI models;

select a virtualized resource from the plurality of virtualized resources based on a suitability score, wherein the suitability score for each of the plurality of virtualized resources is associated with each of the set of the AI models, wherein the suitability score is selected based on one or more benchmark scores of the one or more workflows;

schedule a performance of at least part of the workload on the selected virtualized resource;

output results of the at least part of the workload, wherein the results comprise a set of tags describing properties of the image;

monitor a workload queue for the plurality of virtualized resources for metrics associated with assigning and processing the one or more workflows and additional workflows with corresponding ones of the plurality of virtualized resources; and adjust the hardware configurations for the plurality of virtualized resources based on the metrics from the monitored workload queue.

17. The non-transitory machine readable-medium of claim 16, wherein the instructions that when executed further cause the machine to:

store a list of the one or more workflows available to run on the plurality of virtualized resources in a workflow index, wherein the workflow index is loaded in a memory to speed up in running one or more AI models.

18. The non-transitory machine readable-medium of claim 16, wherein the selected virtualized resource is associated with a hardware configuration comprising at least one of an AI processor or a neural network processor and wherein the hardware configuration further comprises a graphics processing unit (GPU).

19. The non-transitory machine readable-medium of claim 18, wherein the instructions that when executed further cause the machine to:

retrieve information from the benchmark registry;

implement an optimization service as a machine learning service to consume the information; and optimize, based on the consumed information, the selection of the virtualized resource for a cost metric that includes power, speed, and throughput.

20. The non-transitory machine readable-medium of claim 16, wherein the instructions that when executed further cause the machine to:

analyze performance benchmarks of different ones of the hardware configurations; and determine the suitability score for each of the one or more workflows against each of the different ones of the hardware configurations.

* * * * *